United States Patent
Namai et al.

(10) Patent No.: US 9,264,170 B2
(45) Date of Patent: Feb. 16, 2016

(54) TRANSPONDER AND OPTICAL TRANSMISSION APPARATUS

(71) Applicant: FUJITSU LIMITED, Kawasaki-shi, Kanagawa (JP)

(72) Inventors: Yuuichi Namai, Oyama (JP); Eijiro Yoshida, Nomi (JP)

(73) Assignee: FUJITSU LIMITED, Kawasaki (JP)

( * ) Notice: Subject to any disclaimer, the term of this patent is extended or adjusted under 35 U.S.C. 154(b) by 202 days.

(21) Appl. No.: 14/182,576

(22) Filed: Feb. 18, 2014

(65) Prior Publication Data

US 2014/0286633 A1 Sep. 25, 2014

(30) Foreign Application Priority Data

Mar. 19, 2013 (JP) .................................. 2013-056678

(51) Int. Cl.
*H04J 14/02* (2006.01)
*H04B 10/032* (2013.01)
*H04B 10/038* (2013.01)

(52) U.S. Cl.
CPC .......... *H04J 14/0295* (2013.01); *H04B 10/032* (2013.01); *H04B 10/038* (2013.01)

(58) Field of Classification Search
CPC .................................................. H04B 10/032
See application file for complete search history.

(56) References Cited

U.S. PATENT DOCUMENTS

| 2011/0026397 A1* | 2/2011 | Saltsidis | H04L 41/0663 370/228 |
| 2011/0164493 A1* | 7/2011 | Bragg | H04L 12/4625 370/217 |
| 2014/0146663 A1* | 5/2014 | Rao | H04L 45/28 370/228 |
| 2014/0186019 A1* | 7/2014 | Chaudhary | H04B 10/032 398/1 |

FOREIGN PATENT DOCUMENTS

| JP | 2001-77783 | 3/2001 |
| JP | 2004-96514 | 3/2004 |

OTHER PUBLICATIONS

Patent Abstracts of Japan, Publication No. 2001-77783, Published Mar. 23, 2001.
Patent Abstracts of Japan, Publication No. 2004-96514, Published Mar. 25, 2004.

* cited by examiner

*Primary Examiner* — Shi K Li
*Assistant Examiner* — Mina Shalaby
(74) *Attorney, Agent, or Firm* — Staas & Halsey LLP

(57) ABSTRACT

A transponder among a plurality of transponders that are connected with a client device via a plurality of optical couplers, the transponder includes a protection timer configured to be activated when an alarm indication signal transmitted from the client device is received, and a controller configured to control transmission of an optical signal to one of the plurality of optical couplers when the protection timer times out, wherein a timeout value of the protection timer is set to a value different from a timeout value of a protection timer included in another transponder.

10 Claims, 7 Drawing Sheets

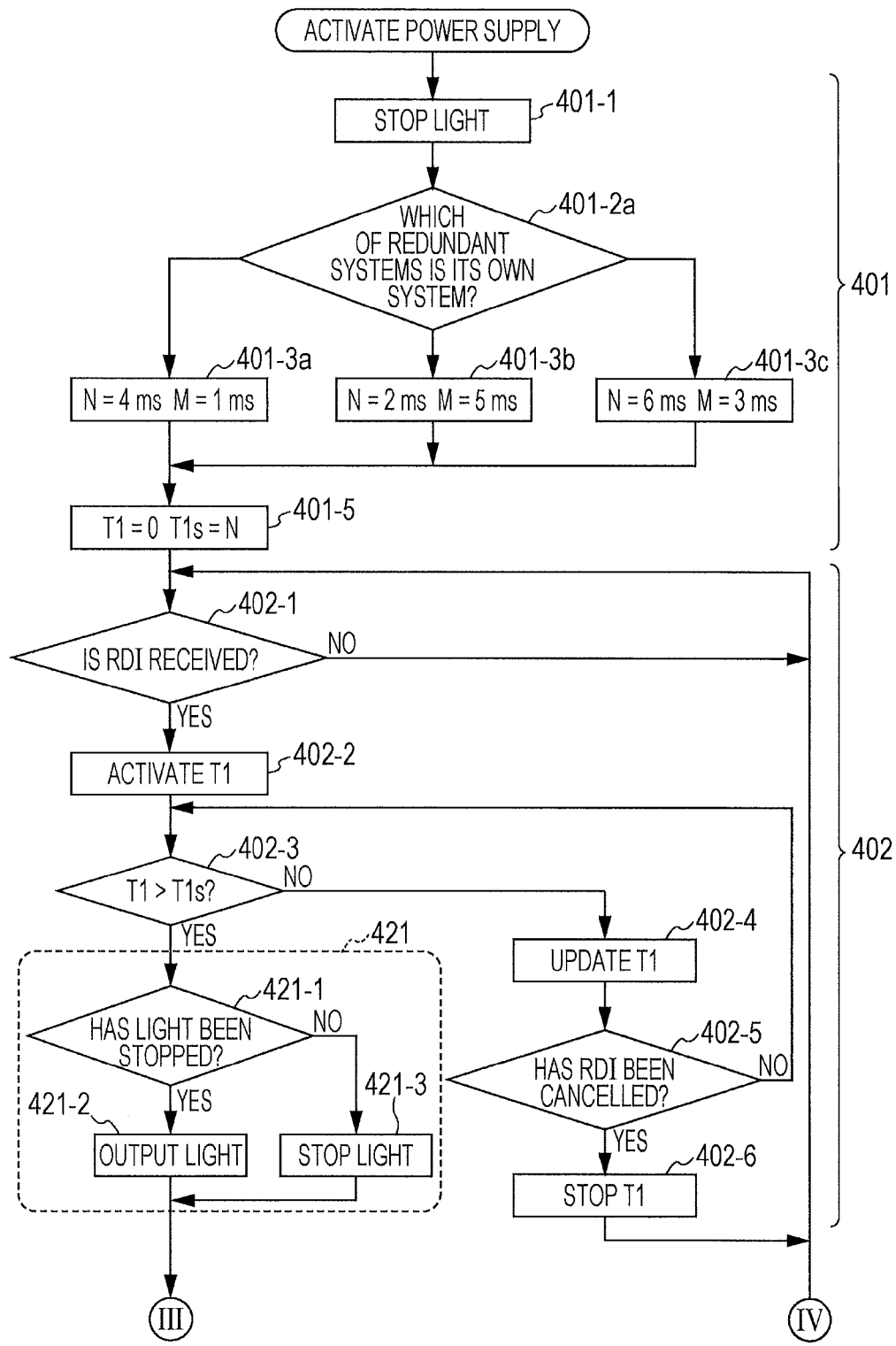

TRANSPONDER AND OPTICAL TRANSMISSION APPARATUS

CROSS-REFERENCE TO RELATED APPLICATION

This application is based upon and claims the benefit of priority of the prior Japanese Patent Application No. 2013-056678, filed on Mar. 19, 2013, the entire contents of which are incorporated herein by reference.

FIELD

An embodiment discussed herein is related to a transponder and an optical transmission apparatus, for example, to a technology that is applicable to the optical transmission apparatuses having a redundant configuration using an optical coupler.

BACKGROUND

Wavelength division multiplexing (WDM) apparatuses have been used when constructing a backbone network with the significant increases in the capacity of networks.

In a WDM apparatus, a redundant configuration designed to increase reliability is employed for a network (see, for example, Japanese Laid-open Patent Publication Nos. 2001-77783 and 2004-96514). In order to select a redundant line (for example, an EAST line/WEST line), a switch (SW) unit having a switching function is used in the WDM apparatus. However, for the purpose of, for example, enhancing the efficiency of the WDM apparatus in terms of the number of lines it contains, the redundant configuration is sometimes implemented by using an optical coupler for connection with a subscriber (client) device, in place of mounting the SW unit in the WDM apparatus.

SUMMARY

According to an aspect of the invention, a transponder among a plurality of transponders that are connected with a client device via a plurality of optical couplers, the transponder includes a protection timer configured to be activated when an alarm indication signal transmitted from the client device is received, and a controller configured to control transmission of an optical signal to one of the plurality of optical couplers when the protection timer times out, wherein a timeout value of the protection timer is set to a value different from a timeout value of a protection timer included in another transponder.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B are flowcharts illustrating a modification of the operation performed by each transponder illustrated in FIG. 2.

DESCRIPTION OF EMBODIMENTS

Figure 1:
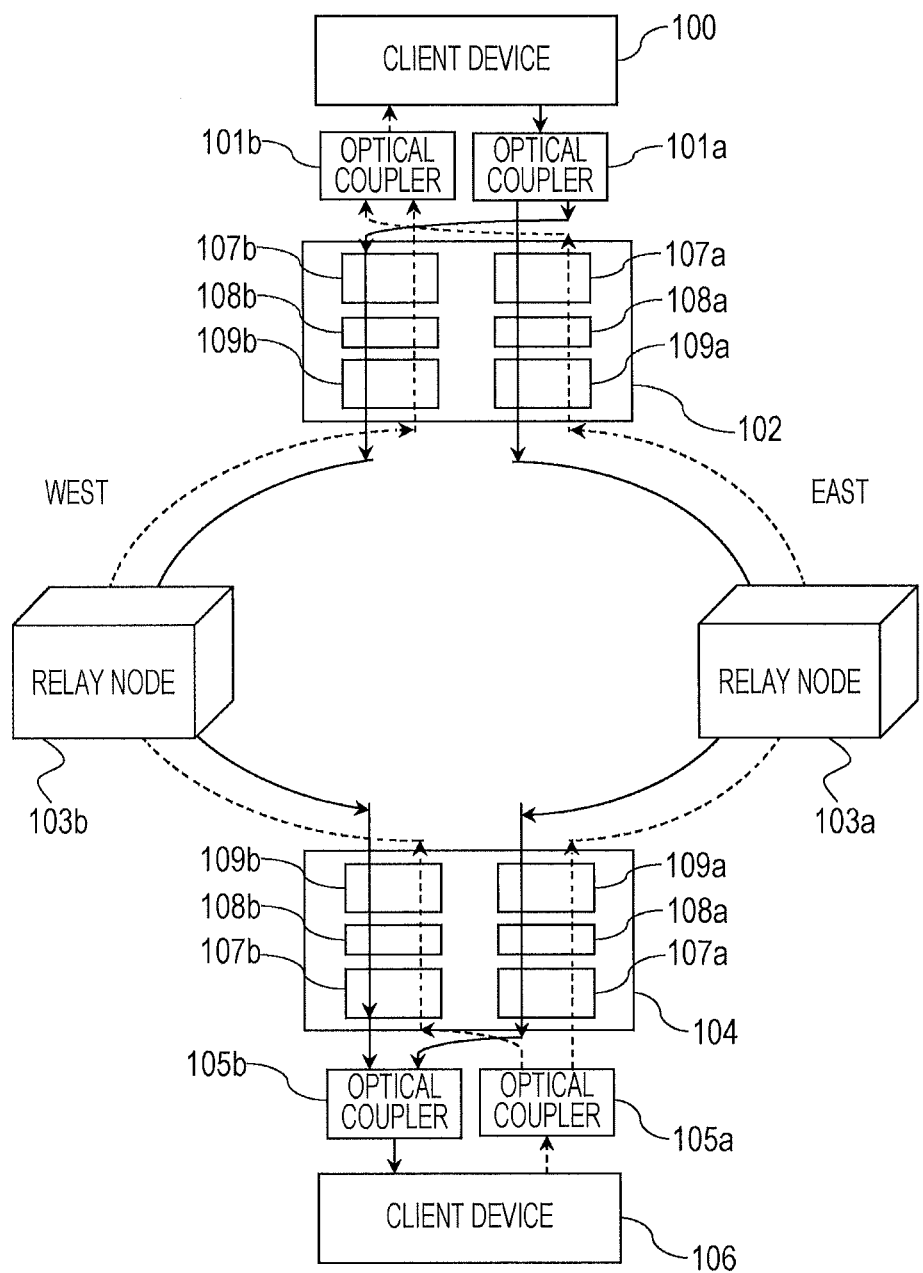
FIG. 1 is a block diagram illustrating an example of an optical network (ring network) having a redundant configuration using WDM apparatuses according to an embodiment.

A WDM apparatus having a redundant configuration using an optical coupler transmits an alarm signal to a client device when the WDM apparatus detects a failure having occurred in a client line. An example of the alarm signal is an alarm indication signal (AIS) or loss of signal (LOS).

When the client device receives the alarm signal, the client device transmits a remote defect indication (RDI), which is an example of an AIS, to the WDM apparatus. The RDI signal is split into two toward both of an East line and a West line by the optical coupler and received by transponders that are included in the WDM apparatus and respectively correspond to the East and West lines.

In this case, not switching performed by the client device but rather switching between transmission signals of the respective transponders has to be performed. However, switching control between optical transmission lines connected with the optical coupler, with which a two to one connection is made, is performed by using pieces of information from two different devices, that is, information on an optical transmission line failure detected by the client device and information on an output state of light subjected to switching control performed by the WDM apparatus. Thus, the switching control has been manually performed by using a device operation.

Embodiments of a transponder capable of performing, without using a device operation, switching control between optical lines that form a redundant configuration will be described below with reference to the drawings. Note that the embodiments to be described below are merely examples and it is not intended that application of various modifications or techniques that are not disclosed below be excluded. In the drawings used in the following embodiments, parts denoted by the same reference numerals are the same or similar parts, unless otherwise noted.

FIG. 1 is a block diagram illustrating an example of an optical network (ring network) having a redundant configuration using WDM apparatuses. Each WDM apparatus is an example of an optical transmission apparatus. The optical network illustrated in FIG. 1 includes, for example, subscriber (client) devices 100 and 106, optical couplers 101a, 101b, 105a, and 105b, WDM apparatuses 102 and 104, and relay nodes 103a and 103b.

The ring network has an East line and a West line. In FIG. 1, the East line is a transmission path that runs through the relay node 103a and the West line is a transmission path that runs through the relay node 103b.

The client device 100 is connected to the WDM apparatus 102 via the optical couplers 101a and 101b. Similarly, the client device 106 is connected to the WDM apparatus 104 via the optical couplers 105a and 105b.

A optical signal transmitted by the client device 100 (or 106) is split into two by the optical coupler 101a (or 105a) and transmitted to the relay nodes 103a and 103b through transponders 107a and 107b that are included in the WDM apparatus 102 (or 104) and respectively correspond to the East line and the West line.

The optical signals of the East line and the West line that have been transmitted through the relay nodes 103a and 103b are received by the opposite WDM apparatus 104 (or 102). The WDM apparatus 104 (or 102) receives, from the relay nodes 103a and 103b of the East line and the West line, with the transponders 107a and 107b respectively corresponding to the East line and the West line, optical signals that are the same as the optical signals obtained by the optical coupler 101a (or 105a) splitting the optical signal into two.

The optical signals received by the transponders 107a and 107b are combined by the optical coupler 105b (or 101b) and transmitted to the client device 106 (or 100).

In this way, in the ring network illustrated in FIG. 1, an optical signal transmitted from the client device 100 (or 106) is split into two by the optical coupler 101a (or 105a) and transmitted to the opposite WDM apparatus 104 (or 102) through the East line and the West line. Subsequently, optical signals of the East line and the West line are combined by the optical coupler 105b (or 101b) and received by the opposite client device 106 (or 100).

In FIG. 1, the reference numerals 108a and 108b respectively denote multiplexing/demultiplexing (MUX/DMUX) units corresponding to the East line and the West line. The reference numerals 109a and 109b respectively denote optical amplifiers corresponding to the East line and the West line.

Figure 2:
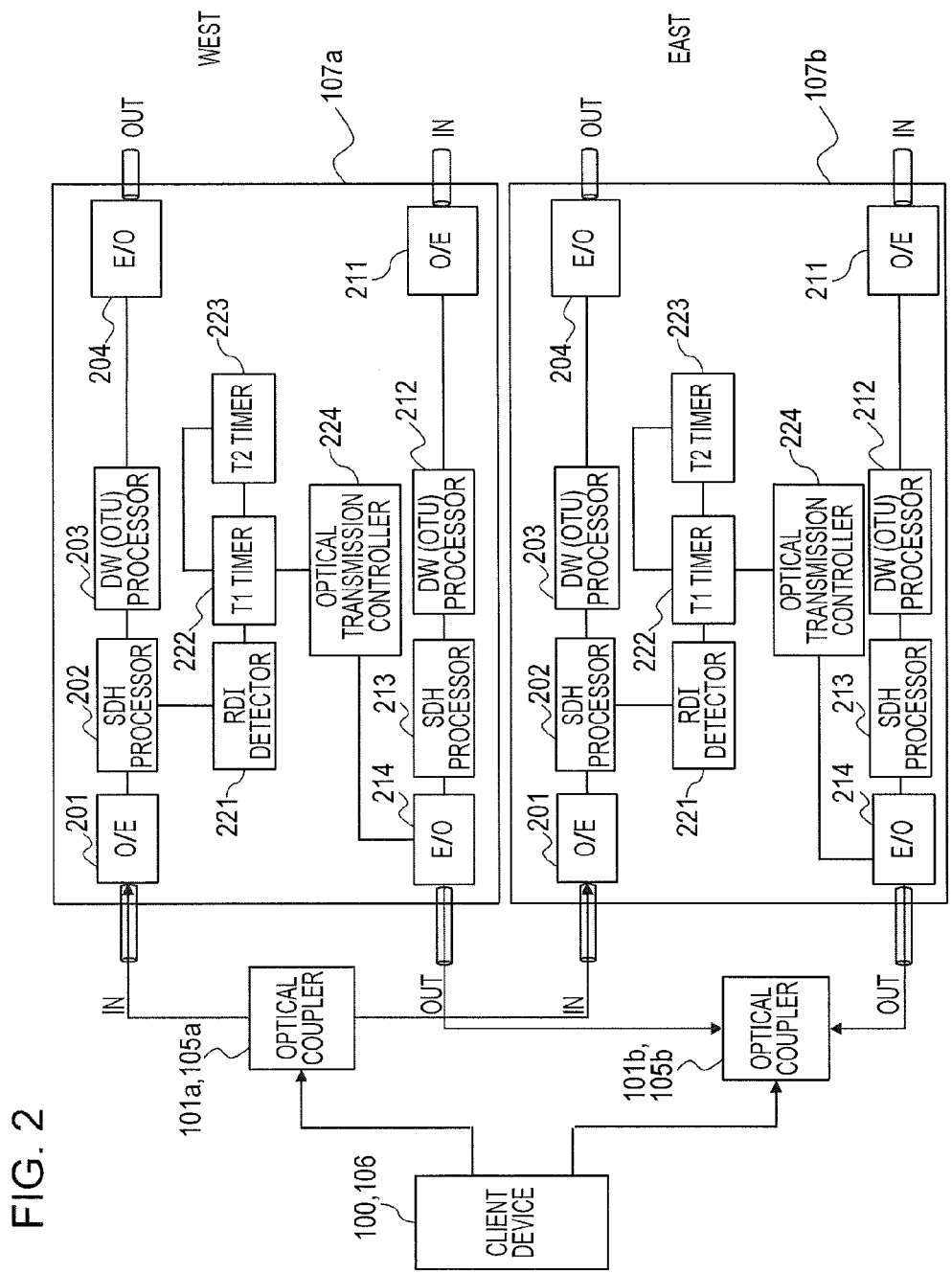
FIG. 2 is a block diagram illustrating an example of the configuration of transponders in each WDM apparatus illustrated in FIG. 1.

Next, FIG. 2 illustrates an example of the configuration of the transponders 107a and 107b described above. The transponders 107a and 107b illustrated in FIG. 2 each include, for example, an optical-to-electrical conversion unit (O/E) 201, an SDH processor 202, a DW (OTU) processor 203, and an electrical-to-optical conversion unit (E/O) 204, which serve as a transmission system toward the relay node 103a (or 103b) (a reception system from the client device 100 (or 106)) as an example.

In addition, the transponders 107a and 107b each include, for example, an optical-to-electrical conversion unit (O/E) 211, a DW (OTU) processor 212, an SDH processor 213, and an electrical-to-optical conversion unit (E/O) 214, which serve as a reception system from the relay node 103a (or 103b) (a transmission system toward the client device 100 (or 106)) as an example.

Furthermore, the transponders 107a and 107b each include, for example, an RDI detector 221, a T1 timer 222 for protecting optical transmission, a T2 timer 223 for waiting for recovery from an RDI state, and an optical transmission controller 224, which serve as a control system as an example.

The O/E 201 converts an optical signal input from the optical coupler 101a (105a) into an electrical signal.

The SDH processor 202 converts the signal (client signal) which has been converted into the electrical signal by the O/E 201 into a frame format of a synchronous digital signal for a synchronous digital hierarchy (SDH) or synchronous optical network (SONET). That is, the client signal is mapped into a payload of an SDH or SONET frame.

The DW (OTU) processor 203 converts, by using a digital wrapper (DW) technique, the synchronous digital signal (frame signal for the SDH or SONET) obtained by the SDH processor 202 into a frame format for an optical channel transport unit (OTU). That is, the synchronous digital signal is wrapped by the OTU and transmitted.

The E/O 204 converts the electrical signal of the OTU frame obtained by the DW (OTU) processor 203 into an optical signal and transmits the optical signal to a network (the relay node 103a or 103b).

The O/E 211 converts an optical signal received from the network into an electrical signal.

The DW (OTU) processor 212 extracts, from an OTU frame of the electrical signal received from the O/E 211, a frame signal (SDH or SONET frame) mapped in the OTU frame.

The SDH processor 213 terminates the frame signal obtained by the DW (OTU) processor 212 and extracts a client signal mapped in the frame signal.

The E/O 214 converts the client signal obtained by the SDH processor 213 into an optical signal and transmits the optical signal to the client device 100 (or 106) (the optical coupler 101b (105b)).

The RDI detector 221 detects an RDI obtained in format conversion performed by the SDH processor 202. That is, when an RDI is transmitted from the client device 100 (or 106) having received an alarm signal, such as a LOS, the RDI detector 221 detects the RDI.

The T1 timer 222 is activated when an RDI is detected by the RDI detector 221, and measures a first timer period (T1).

The T2 timer 223 is activated when the T1 timer 222 ends (times out), and measures a second timer period which is different from the first timer period.

When the T1 timer 222 times out, the optical transmission controller 224 controls optical transmission performed by the E/O 214, that is, the E/O 214 for transmitting an optical signal is controlled by the optical transmission controller 224. For example, the optical transmission controller 224 stops optical transmission performed by the E/O 214 when the E/O 214 is in a state in which an optical signal is able to be transmitted, and starts optical transmission performed by the E/O 214 when the E/O 214 is in an optical transmission stop state that is a state in which the E/O 214 is controlled to stop transmitting the optical signal. In addition, in the case where an RDI is continuously detected (an RDI is not cancelled) even when the T2 timer 223 times out, the optical transmission controller 224 determines that a failure has occurred. At this time, a failure notification may be made to, for example, a network management system (NMS).

Figure 3:
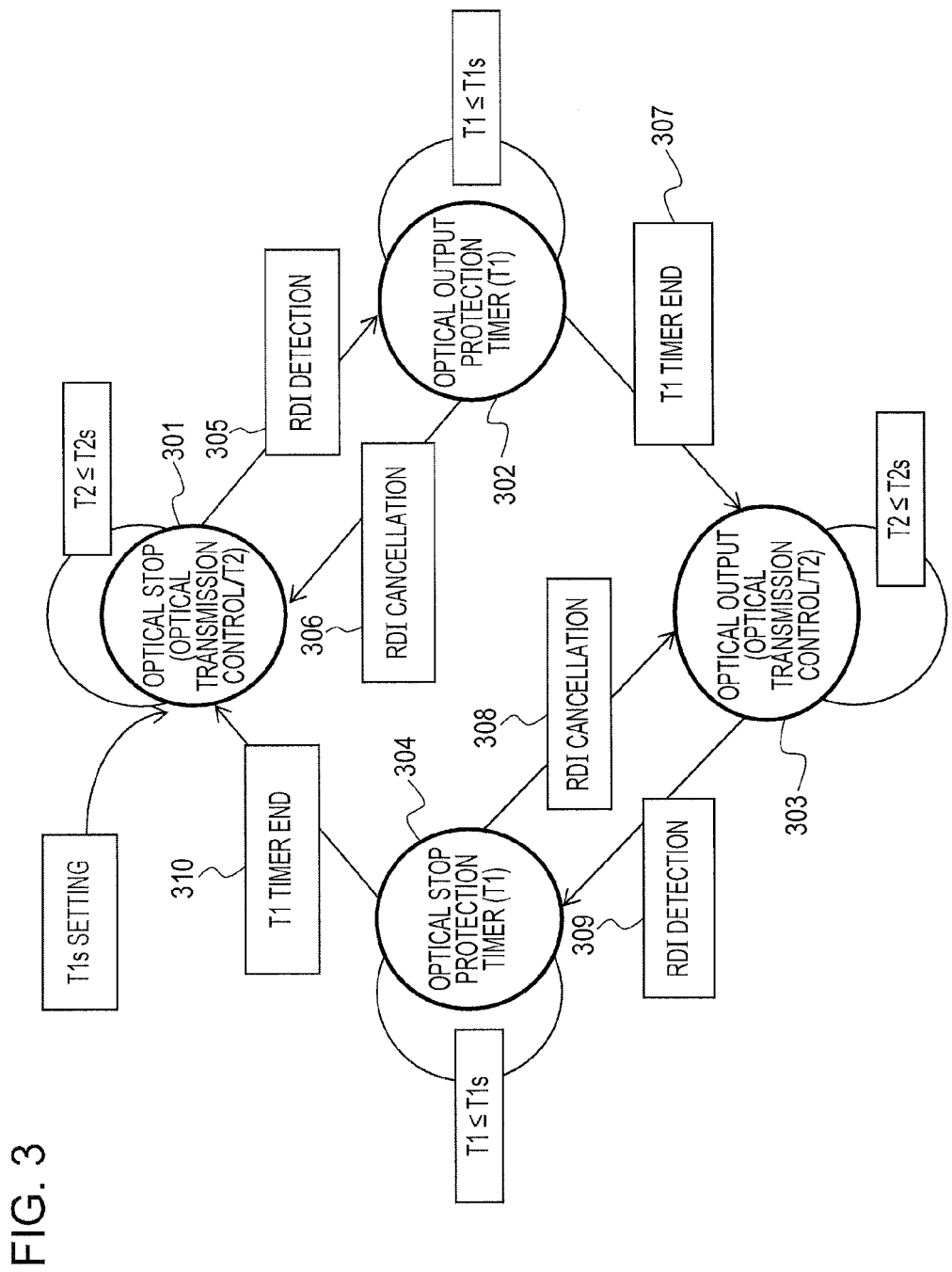
FIG. 3 is a state transition diagram of each transponder illustrated in FIG. 2.

FIG. 3 illustrates an example of a state transition of the transponder 107a (107b) according to the above control performed by the optical transmission controller 224.

As illustrated in FIG. 3, when an RDI transmitted from the client device 100 (or 106) is detected (state transition 309) while the transponder 107a or 107b is transmitting light to the client device 100 (or 106) (state 303), the T1 timer 222 is activated (state 304).

When cancellation of an RDI is detected (state transition 308) while the T1 timer 222 is running, the optical transmission controller 224 determines that transmission is normal, and continues a current optical output state of the E/O 214 (state 303).

When cancellation of an RDI is not detected before the T1 timer 222 times out (state transition 310), the optical transmission controller 224 stops optical output performed by the E/O 214, that is, the optical transmission controller 224 controls the E/O 214 to not transmit an optical signal. Subsequently, the T2 timer 223 is activated (state 301), resulting in a state of waiting for RDI cancellation due to optical output performed by another system. If the transponder 107a (107b) is positioned as its own system, optical output performed by the other system refers to optical output performed by the E/O 214 of the other transponder 107b (107a).

Next, there will be described a state transition made when a system whose optical transmission has been stopped (hereinafter also referred to as an "optical stop system") performs switching control.

When an RDI is detected (state transition 305) in an optical stop state (state 301), the T1 timer 222 is activated (state 302).

When an RDI is cancelled (state transition 306) while the T1 timer 222 is running, the optical transmission controller 224 determines that optical output performed by the other system is normal, and continues a current optical output state (optical stop) (state 301).

When an RDI is not cancelled before the T1 timer 222 times out (state transition 307), the optical transmission controller 224 starts optical output performed by the E/O 214, that is, the optical transmission controller 224 controls the E/O 214 to start transmitting an optical signal (state 303). Also, the T2 timer 223 is activated (state 303), resulting in a state of waiting for RDI cancellation due to optical output performed by the other system.

In FIG. 3, T1 denotes a count value of the T1 timer 222, T1s denotes a timeout value of the T1 timer 222, T2 denotes a count value of the T2 timer 223, and T2s denotes a timeout value of the T2 timer 223. "T1≤T1s" represents that a state transition does not occur while the T1 timer 222 has not timed out. Similarly, "T2≤T2s" represents that a state transition does not occur while the T2 timer 223 has not timed out.

Figure 4A:
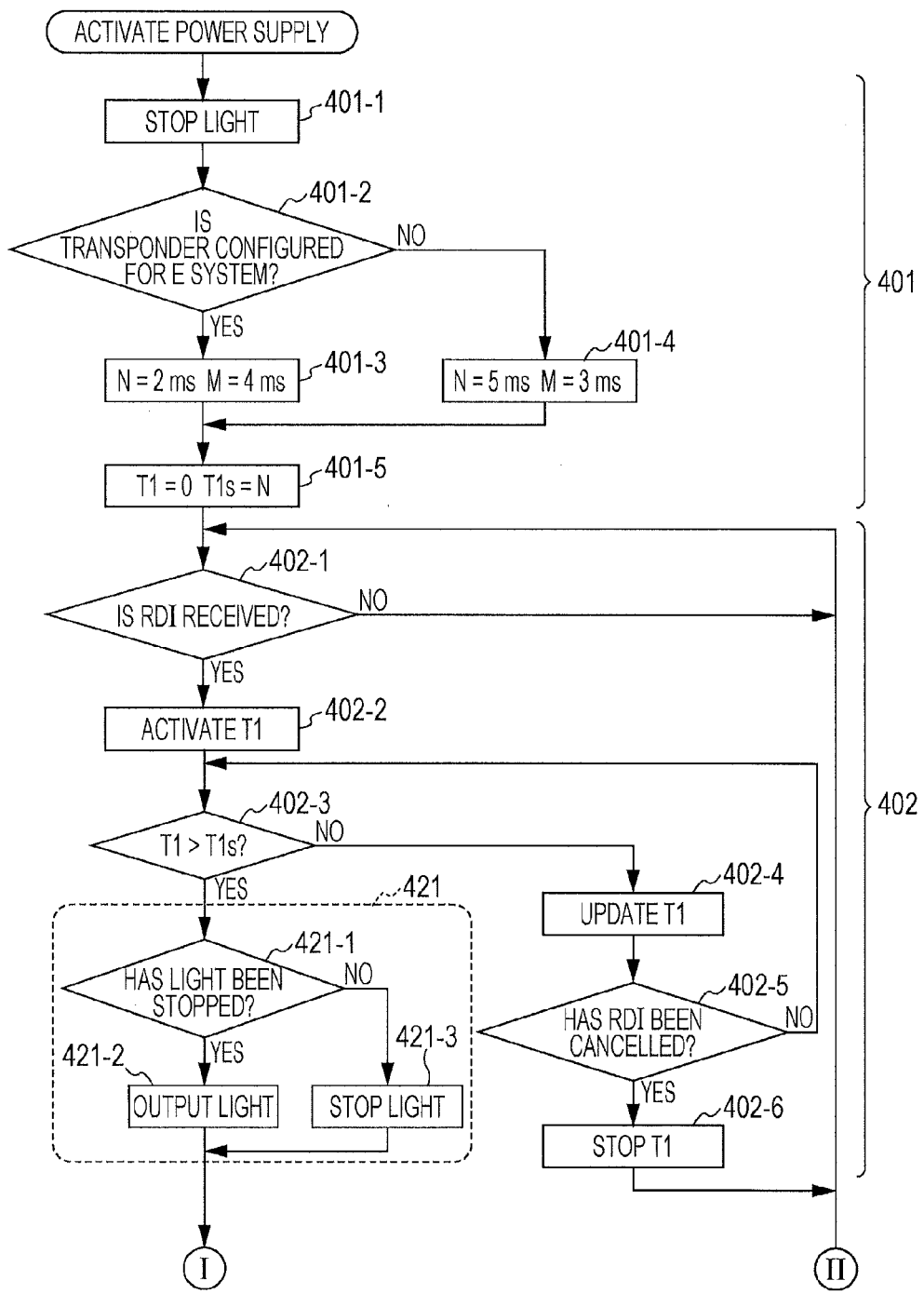
FIGS. 4A and 4B are flowcharts illustrating an operation performed by each transponder illustrated in FIG. 2.
Figure 4B:
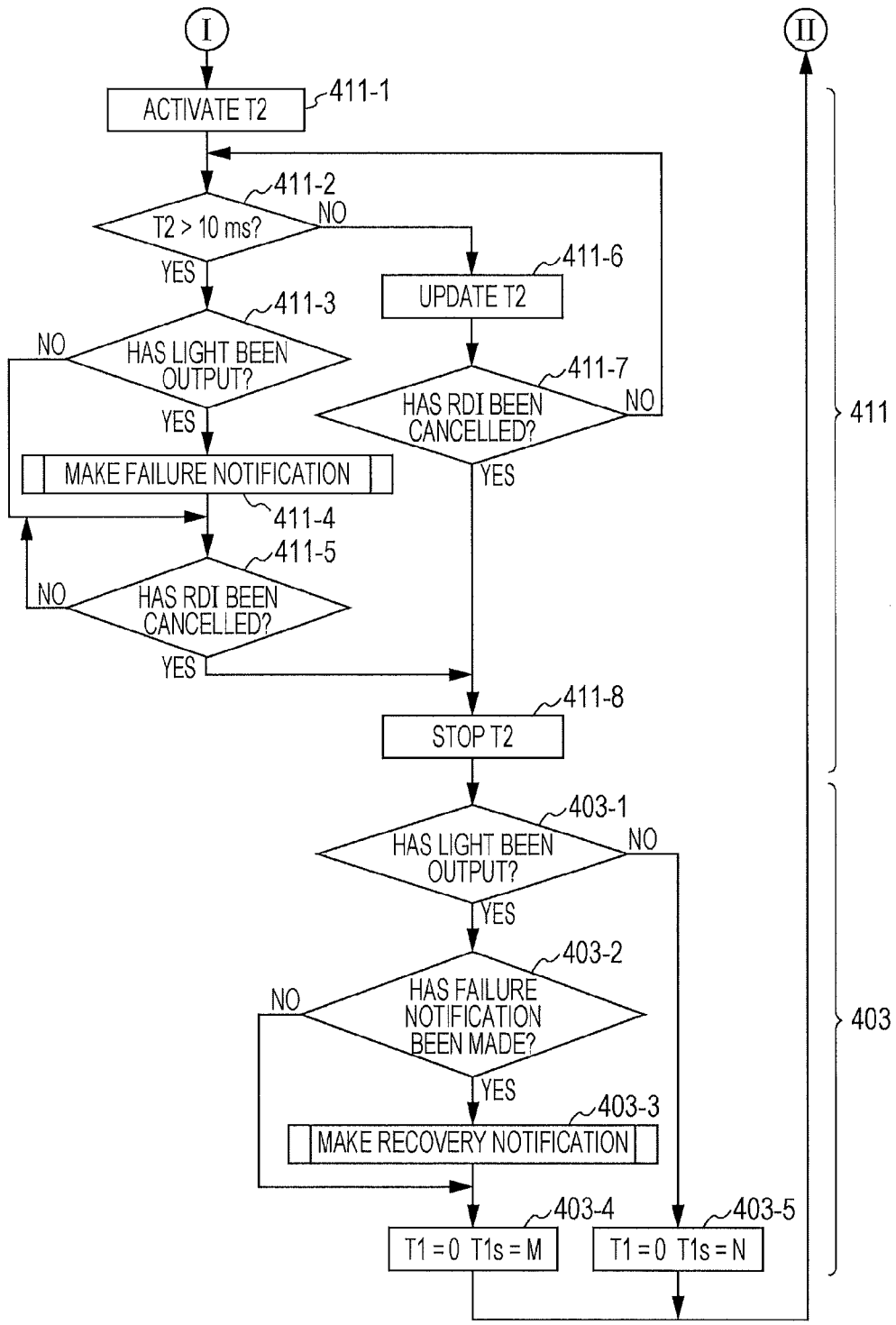

Next, FIGS. 4A and 4B illustrate examples of flowcharts of the above optical transmission control (switching process) performed by the optical transmission controller 224.

The reference numeral 401 denotes a processing flow for an initial setting of the T1 timer 222. The initial setting process is performed when the transponder 107a (or 107b) is activated, and an optical transmission stop process in a redundant system and a T1 timer initial setting are performed.

That is, in an optical transmission stop state that is a state in which an optical signal is not transmitted (operation 401-1), the optical transmission controllers 224 of the transponders 107a and 107b respectively check whether or not the transponders 107a and 107b themselves are configured for an East system (E system) (operation 401-2). When the transponder 107a (107b) itself is configured for the E system (YES in operation 401-2), the optical transmission controller 224 sets a variable N=2 ms and a variable M=4 ms (operation 401-3), initializes the count value T1 of the T1 timer 222 to 0, and also sets the timeout value T1s of the T1 timer 222 to N (=2 ms) (operation 401-5).

On the other hand, when the transponder 107a (107b) itself is configured for a West system (W system) (NO in operation 401-2), the optical transmission controller 224 sets the variables N and M to values different from those in the E system (N=5 ms and M=3 ms) (operation 401-4), initializes the count value T1 of the T1 timer 222 to 0, and also sets the timeout value T1s of the T1 timer 222 to N (=5 ms).

Next, in FIG. 4A, the reference numeral 402 denotes a processing flow performed by the T1 timer 222. The optical transmission controller 224 monitors whether or not an RDI is detected by the RDI detector 221 (a NO route in operation 402-1). When an RDI is detected (YES in operation 402-1), the optical transmission controller 224 activates the T1 timer 222 (operation 402-2).

Subsequently, the optical transmission controller 224 monitors whether or not the T1 timer 222 has timed out (the relationship of T1>T1s has been satisfied) (operation 402-3). When the T1 timer 222 has not timed out (NO in operation 402-3), the count value T1 is updated (operation 402-4), and the optical transmission controller 224 checks whether or not an RDI has been cancelled (operation 402-5).

When an RDI has been cancelled (YES in operation 402-5), the optical transmission controller 224 stops the T1 timer 222 (operation 402-6), returns to the operation 402-1, and monitors whether or not an RDI is detected. When an RDI has not been cancelled (NO in operation 402-5), the optical transmission controller 224 returns to the operation 402-3 and monitors whether or not the T1 timer 222 has timed out (the relationship of T1>T1s has been satisfied).

Next, in FIG. 4A, the reference numeral 421 denotes an optical output control flow. When the T1 timer 222 has timed out (T1>T1s: YES in operation 402-3), the optical transmission controller 224 checks whether its own system is an optical output system which is in an optical output state or an optical stop system which is in an optical output stop state (operation 421-1).

When its own system is an optical stop system (YES in operation 421-1), the optical transmission controller 224 controls the E/O 214 so as to start optical output (operation 421-2). On the other hand, when its own system is an optical output system (NO in operation 421-1), the optical transmission controller 224 controls the E/O 214 so as to stop optical output (operation 421-3).

Next, in FIG. 4B, the reference numeral 411 denotes an RDI recovery-waiting processing flow. This process 411 is executed after the optical output control process 421 ends. That is, when the optical output control process ends, the T2 timer 223 is activated (operation 4114), and the optical transmission controller 224 monitors whether or not the T2 timer 223 has timed out (for example, the relationship of the count value T2>10 ms has been satisfied) (operation 411-2).

When the T2 timer 223 has not timed out (NO in operation 411-2), the count value T2 of the T2 timer 223 is updated (operation 411-6), and the optical transmission controller 224 checks whether or not an RDI has been cancelled (operation 411-7).

When an RDI has not been cancelled (NO in operation 411-7), the optical transmission controller 224 returns to the operation 411-2 and monitors whether or not the T2 timer 223 has timed out. When an RDI has been cancelled (YES in operation 411-7) while the T2 timer 223 is running, the optical transmission controller 224 determines that normal communication using an optical output has been performed in either its own system or the other system, and stops the T2 timer 223 (operation 411-8).

On the other hand, when the T2 timer 223 has timed out (YES in operation 411-2), the optical transmission controller 224 checks whether its own system is an optical output system or an optical stop system (operation 411-3). When its own system is an optical output system (YES in operation 411-3), the optical transmission controller 224 determines that a failure has occurred, and makes a failure notification (operation 411-4). On the other hand, when its own system is an optical stop system (NO in operation 411-3), the optical transmission controller 224 monitors whether or not an RDI has been cancelled.

Subsequently, the optical transmission controller 224 monitors whether or not an RDI has been cancelled (NO in operation 411-5). When an RDI has been cancelled (YES in operation 411-5), the optical transmission controller 224 stops the T2 timer 223 (operation 411-8).

Next, in FIG. 4B, the reference numeral 403 denotes a processing flow subsequent to the process performed by the T1 timer 222 for protecting optical transmission. The processing flow 403 subsequent to the T1 timer process is executed at a point in time when the T2 timer 223 is stopped. That is, when the T2 timer 223 is stopped, the optical transmission controller 224 checks whether its own system is an optical output system or an optical stop system (operation 403-1).

When its own system is an optical output system (YES in operation 403-1), the optical transmission controller 224 checks whether or not a failure notification has been made (operation 403-2). When a failure notification has been made (YES in operation 403-2), the optical transmission controller 224 makes a recovery notification (operation 403-3).

In addition, the optical transmission controller 224 resets the count value T1 of the T1 timer 222 to 0, and also sets the timeout value T1s of the T1 timer 222 to M (operation 403-4). When a failure notification has not been made (NO in operation 403-2), the optical transmission controller 224 does not make a recovery notification, but updates the count value T1 and the timeout value T1s of the T1 timer 222 (operation 403-4).

When its own system is an optical stop system (NO in operation 403-1), the optical transmission controller 224 resets the count value T1 of the T1 timer 222 to 0, and also sets the timeout value T1s of the T1 timer 222 to N (operation 403-5).

Figure 5B:
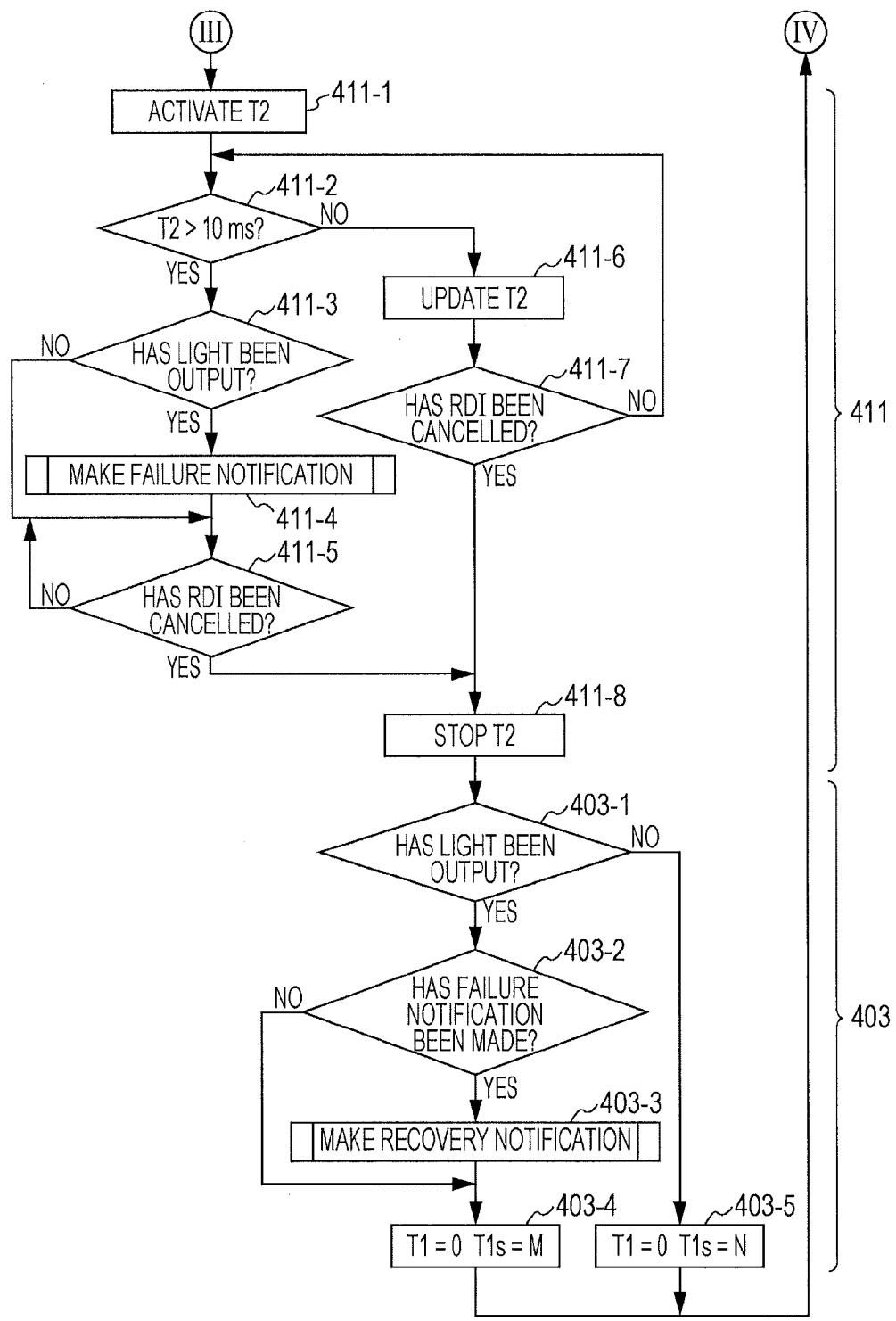

In the above example, two redundant lines are provided; alternatively, even in the case where three or more redundant lines are provided, when the timeout value of the T1 timer 222 is defined for each line, operations equivalent to those illustrated in FIGS. 4A and 4B may be performed. FIGS. 5A and 5B illustrate such an example (the case of three lines). In FIG. 5A, the optical transmission controller 224 determines which of redundant systems its own system is (operation 401-2a), and sets variables M and N corresponding to a determined redundant system (operations 401-3a, 401-3b, and 401-3c). After that, operations equivalent to those illustrated in FIGS. 4A and 4B are performed.

As described above, the transponders 107a and 107b according to the foregoing embodiments each include the T1 timer 222 that is activated upon detection of a change in the state of an RDI transmitted from the client device 100 (106), and the optical transmission controller 224 that performs optical output control upon timeout of the T1 timer 222.

This enables switching between transmission lines connected with the optical coupler 101a (105a) without another notification device being provided between the client device 100 (106) and the WDM apparatus 102 (104), and between the transponders 107a and 107b of the WDM apparatus 102 (104). In other words, redundant configuration switching using the optical coupler 101a (105a) is able to be performed without a change being made to the client device 100 (106) and also without control using a device operation being performed.

Additionally, a timeout value is set in the T1 timer 222 differently depending on an optical transmission state, and thus control may be performed so that both the transponders 107a and 107b connected to an input of the optical coupler 101a (105a) are not simultaneously put into a state in which an optical signal is able to be transmitted. This control is able to be performed independent of an optical output state of another system forming a redundant configuration. Hence, the fact that optical outputs from the different transponders 107a and 107b are mixed in the optical coupler 101b (105b) may be avoided with a simple mechanism.

Furthermore, the T2 timer 223 that monitors detection of an RDI for a certain period regardless of an optical output state is provided, and thus it may be determined that a failure has occurred in an optical transmission line or the optical couplers 101a and 101b (105a and 105b).

As illustrated in FIG. 5A, a timeout value is defined differently depending on the number of redundant lines, and thus the embodiment is adaptable to a redundant configuration having three or more lines.

When a WDM line failure occurs, switching of a largest number of contained lines (40 lines in the case of a WDM apparatus for 40 waves) is performed. In this case, switching control is able to be performed on each line individually and independently, and a switching time period depending on the number of contained lines is not increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although embodiments of the present invention have been described in detail, it should be understood that the various changes, substitutions, and alterations could be made hereto without departing from the spirit and scope of the invention.

What is claimed is:

1. A transponder among a plurality of transponders connected with a client device via a plurality of optical couplers, the transponder comprising:
   a protection timer configured to be activated when an alarm indication signal transmitted from the client device is received; and
   a controller configured to control transmission of an optical signal to one of the plurality of optical couplers when the protection timer times out,
   wherein a timeout value of the protection timer is set to a value different from a timeout value of a protection timer included in another transponder.

2. The transponder according to claim 1, wherein
   when the protection timer times out while the transmission to the one of the plurality of optical couplers is being performed, the controller stops the transmission, and
   when the protection timer times out while the transmission to the one of the plurality of optical couplers is stopped, the controller starts the transmission to the one of the plurality of optical couplers.

3. The transponder according to claim 1, further comprising:
   a waiting timer configured to monitor cancellation of the alarm indication signal after a state in which the transmission is controlled,
   wherein, in a case where the alarm indication signal is not cancelled when the waiting timer times out, the controller determines that a failure has occurred and performs a failure notification process.

4. The transponder according to claim 2, further comprising:
   a waiting timer configured to monitor cancellation of the alarm indication signal after a state in which the transmission is controlled,
   wherein, in a case where the alarm indication signal is not cancelled when the waiting timer times out, the controller determines that a failure has occurred and performs a failure notification process.

5. An optical transmission apparatus comprising:
   a plurality of transponders configured to connect with a client device via a plurality of optical couplers, a transponder among the plurality of transponders including:
      a protection timer configured to be activated when an alarm indication signal transmitted from the client device is received; and
      a controller configured to control transmission of an optical signal to one of the plurality of optical couplers when the protection timer times out,
   wherein a timeout value of the protection timer is set to a value different from a timeout value of a protection timer included in another transponder.

6. The optical transmission apparatus according to claim 5, wherein
when the protection timer times out while the transmission to the one of the plurality of optical couplers is being performed, the controller stops the transmission, and
when the protection timer times out while the transmission to the one of the plurality of optical couplers is stopped, the controller starts the transmission to the one of the plurality of optical couplers.

7. The optical transmission apparatus according to claim 5, further comprising:
a waiting timer configured to monitor cancellation of the alarm indication signal after a state in which the transmission is controlled,
wherein, in a case where the alarm indication signal is not cancelled when the waiting timer times out, the controller determines that a failure has occurred and performs a failure notification process.

8. The optical transmission apparatus according to claim 6, further comprising:
a waiting timer configured to monitor cancellation of the alarm indication signal after a state in which the transmission is controlled,
wherein, in a case where the alarm indication signal is not cancelled when the waiting timer times out, the controller determines that a failure has occurred and performs a failure notification process.

9. The optical transmission apparatus according to claim 5, further comprising:
two redundant lines coupled with the plurality of transponders.

10. The optical transmission apparatus according to claim 5, further comprising:
three or more redundant lines coupled with the plurality of transponders.

* * * * *